Patented Feb. 27, 1934

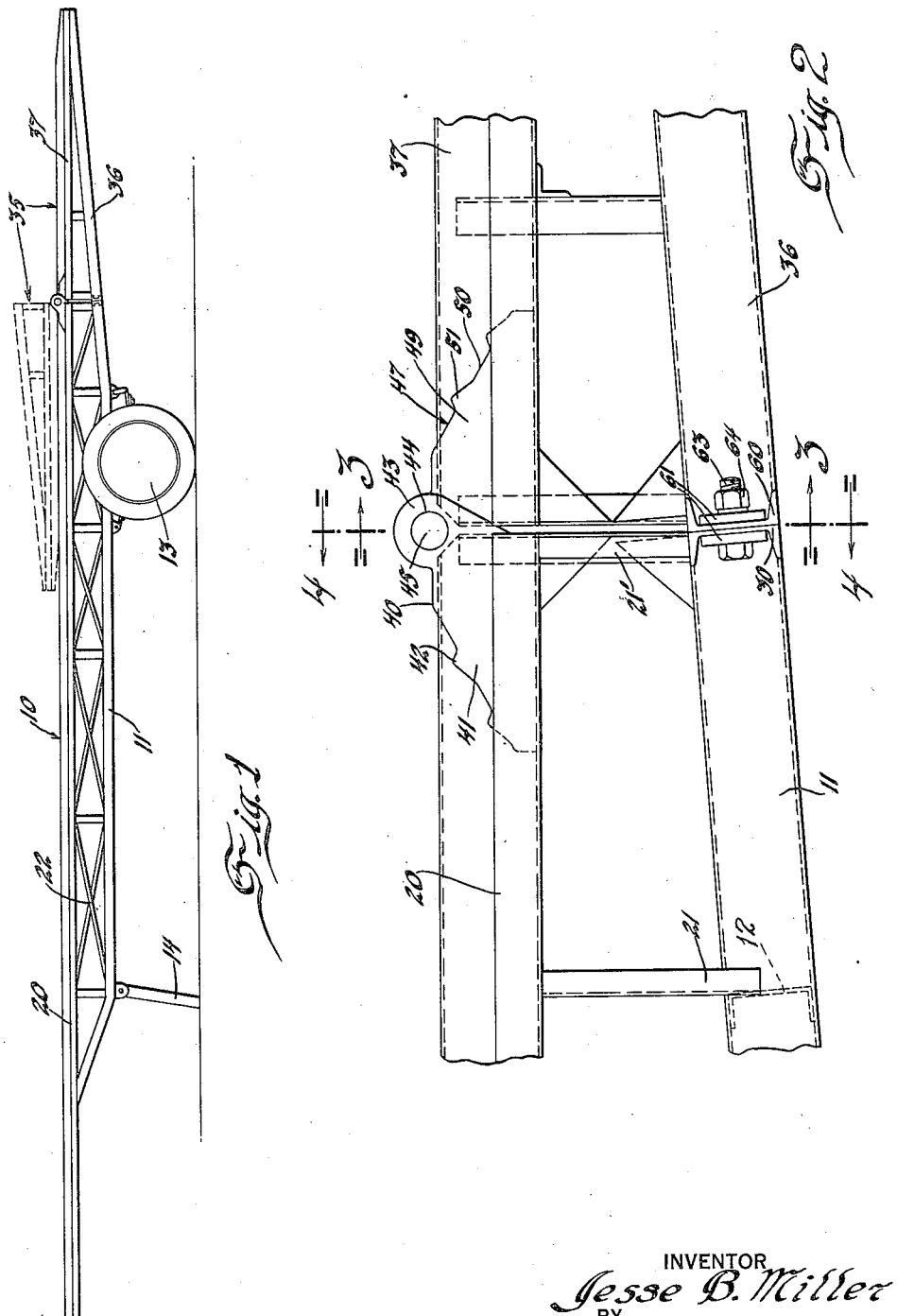

1,949,172

UNITED STATES PATENT OFFICE 1,949,172

MEANS FOR TRANSPORTING VEHICLES AND
THE LIKE

Jesse B. Miller, Toledo, Ohio, assignor to Whitehead & Kales Company, River Rouge, Mich., a corporation of Michigan Application August 17, 1931. Serial No. 557,657

14 Claims. (Cl. 280—33.1)

This invention relates to transportation means adapted more particularly for use in the transportation of vehicles such as automobiles and the like.

One of the primary objects of this invention is to provide a transportation means of the above mentioned character which, when used in transporting vehicles will be of sufficient length to support at one time a plurality of vehicles arranged end to end but which will be adapted to have its overall length reduced, when not in use for the transportation of vehicles, to facilitate its return to the point of loading.

The invention further contemplates the provision of a transportation means which will include a relatively long runway or track and to provide means for so mounting a portion of this runway that the same may be moved to and from operative vehicle supporting positions.

Numerous other objects and advantages of this invention will become more apparent as the following description proceeds, particularly when reference is had to the accompanying drawings, wherein:

Fig. 1 is a semi-diagrammatic elevational view of a transportation means constructed in accordance with the teachings of this invention:

Fig. 2 is an enlarged elevational view of a portion of the structure shown in Fig. 1;

In the transportation of vehicles, such as automobiles, from place to place such, for example, as from the factory to a point of distribution, it is customary to provide a vehicle of substantial length which is capable of carrying at one time four vehicles arranged end to end. For this purpose semi-trailers have been provided, these trailers as a general rule being provided with elongated runways or tracks of sufficient length to receive at one time the desired number of vehicles. The forward ends of these semi-trailers are connected to and supported upon the rear ends of power trucks, tractors or the like, while the rear ends of the semi-trailers are supported by ground-engaging wheels.

Generally these trailers are loaded only during their trip from the factory to the point of distribution, returning unloaded to the factory. To reduce the expense of returning the unloaded trailers to the factory for reloading, the present invention contemplates the provision of a trailer which, with the tractor, truck or the like which provides the motive power for the trailer, may be loaded on a second trailer whereby a single truck or the like may be utilized for returning to the factory two trailers and one truck. State laws require that the overall length of vehicles be within certain limits, and since the overall lengths of the trailers and trucks are generally barely within these limits, it would be impossible to load one truck and trailer on another trailer without exceeding the established limits unless provision were made for decreasing the overall length of the trailer which is being transported. To accomplish this, the present invention provides a trailer so constructed that its overall length may be reduced when the trailer is not in use for the transporting of vehicles with the result that the trailer, after its length is reduced, may be loaded on another trailer without projecting beyond the end of the latter and thus without exceeding the limits as to overall length set by law.

Figure 3:
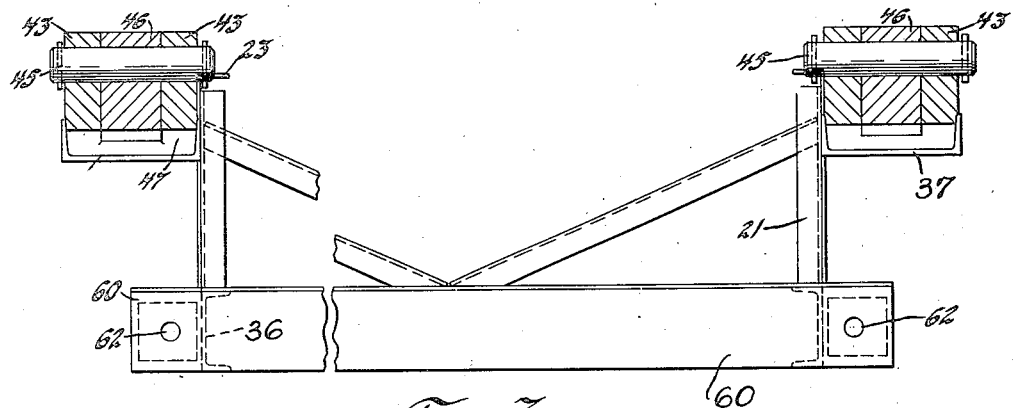
Fig. 3 is a sectional view taken substantially on the line 3—3 of Fig. 2 of the drawings looking in the direction of the arrows.
Figure 4:
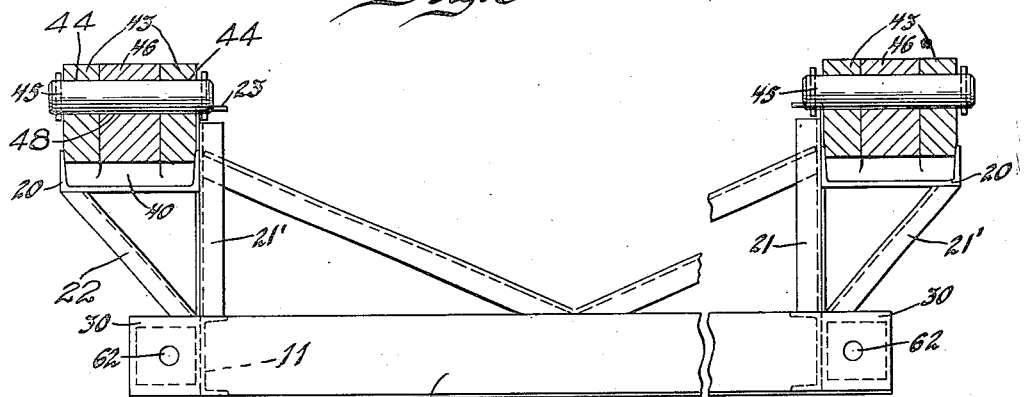
Fig. 4 is a sectional view taken substantially on the line 4—4 of Fig. 2 looking in the direction of the arrows.

Referring then particularly to the drawings wherein like reference character designate corresponding parts throughout all views, there is semi-diagrammatically illustrated in Fig. 1 of the drawings a semi-trailer designated generally by the reference character 10. This trailer comprises a subframe construction formed of longitudinally extending structural elements 11 which may, as illustrated in Figs. 3 and 4 of the drawings, be substantially channel shaped in cross section. These structural elements are connected at spaced points by transversely extending elements such as the channel bars 12 to provide a rigid frame construction. The rear end of this frame construction is supported by ground-engaging wheels 13, while the forward end may be supported, when the trailer is not connected to a truck, by suitable folding legs or supports 14.

Supported from the elements 11 are longitudinally extending structural elements 20. Two of these elements are provided and they are spaced apart laterally a distance sufficient to provide a track for the wheels of vehicles to be transported. The spacing of these members is clearly illustrated in Fig. 4 of the drawings as well as is the cross sectional shape of these elements. While these elements are shown as being substantially channel shape in cross section, it is to be understood that these elements may be of any desired cross sectional shape in so far as they together provide a runway or track for the vehicles to be transported.

It will be noted that each element 20 is arranged slightly to one side of its respective support 11, and each element is connected to its respective supporting element 11 by a suitable supporting framework. Thus, vertically arranged angle bars 21 may be provided having their lower ends fixed as by welding or the like to the elements 11 and having their upper ends welded or the like to the inner sides of the corresponding track members 20. Further, suitable diagonally arranged angle irons 22 may be provided, these angle bars being fixed at their upper and lower ends to the track members 20 and elements 11, respectively, to support the track members from the elements 11, as will be readily apparent.

The track members 20 project forwardly beyond the ends of the members 11 and are secured at their forward ends to a suitable fifth wheel construction (not shown), by which the forward end of the trailer may be secured to and supported upon the rear end of a truck, tractor or the like. A suitable angle bar 23 may, if desired, be secured to the inner edge of each track member 20, as illustrated in Fig. 3 of the drawings, to provide a guide for the wheels of vehicles on the track members.

As illustrated in Fig. 1 of the drawings, the track members 20 extend rearwardly to a point slightly beyond the wheels 13. The elements 11 also terminate at their rear ends in the vertical plane of the ends of the members 20, and the rear ends of the elements 11 are preferably secured to each other by a transversely extending channel bar or the like 30 which projects laterally slightly beyond the sides of the elements 11, as clearly illustrated in Fig. 4 of the drawings. Suitable uprights 21' are provided for securing the rear ends of the elements 11 to the rear ends of the track members 20 to reinforce the track members at this point.

The reference character 35 designates generally an extension for the runway formed by the track members 20. This extension comprises a subframe construction formed of longitudinally extending elements 36 which are aligned with and are similar to the elements 11. The elements 36 are inclined upwardly and are secured at their rear ends to the rear ends of elements 37 which are similar to and are aligned with the track members 20. The extension 35 thus constitutes an auxiliary runway or platform which, when in the position illustrated in solid lines in Fig. 1 of the drawings, constitutes a horizontal vehicle supporting extension of the runway formed by the members 20. The extension 35, however, is so connected to the main runway as to provide for decreasing the overall length of the semitrailer to the length of the main runway formed by the members 20.

Figure 5:
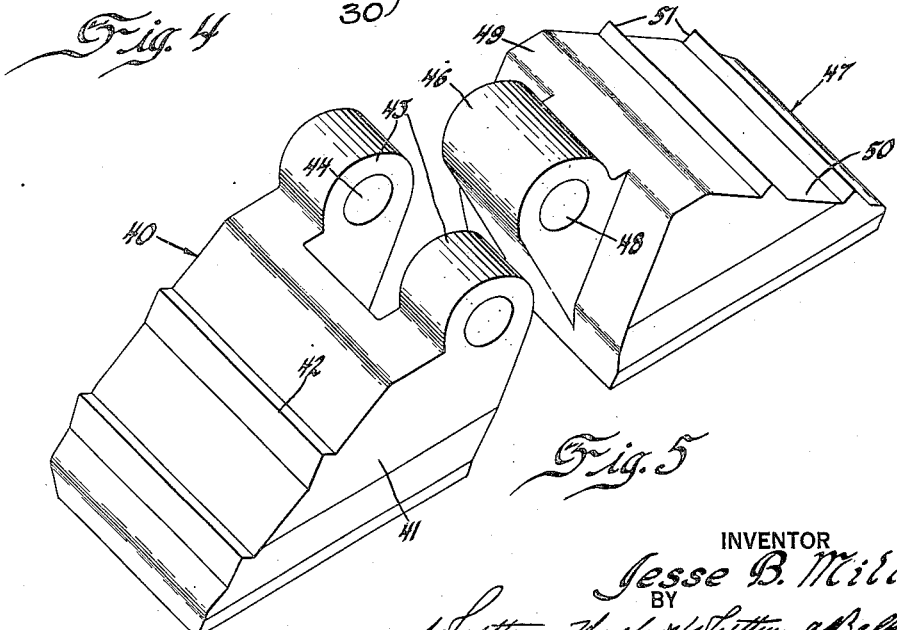
Fig. 5 is a perspective view of a portion of the structure shown in Fig. 2.

In the embodiment of the invention illustrated, the section 35 is hingedly connected to the rear end of the track sections 20, and for this purpose suitable hinges are provided, one of these hinges being shown in detail in Fig. 5 of the drawings. Each hinge comprises a pair of hinge members, one of which is fixed to the rear end of one track section 20 and the other of which is fixed to the forward end of the corresponding element 37. The hinge member which is fixed to the rear end of the track section is designated by the reference character 40 and comprises a casting having a body portion 41 adapted to be received between the upstanding flanges of the track section 20 and to rest upon the base of this track section, as clearly illustrated in Fig. 4 of the drawings. The body portion of this hinge member is welded or otherwise fixed in position adjacent the rear end of the track section 20, as will be readily apparent.

The upper face of the body portion of the hinge member 40 is inclined upwardly and is provided with the transversely extending ribs 42 for a purpose which will hereinafter be more fully described. Supported by the body section of the hinge member and slightly to the rear of and above the same are bosses 43 provided with bores 44 for receiving a hinge pin 45. The bosses 43 are spaced apart a distance sufficient to receive a boss 46 which forms a part of hinge member 47, which hinge member is secured to the forward end of the corresponding member 37. The boss 46 is provided with a bore 48, which, when the boss 46 is in position between the bosses 43, is aligned with the bores 44 so that the hinge pin may pass through the aligned bores in the bosses 43 and 46 to pivotally secure the hinge members to each other.

The boss 46 is supported slightly above and forwardly of the body portion 49 of the hinge member 47. This body portion 49 is of a width sufficient to fit within the flanges of the element 37 and is secured to the base of the element 37 as by welding or the like, as clearly illustrated in Fig. 4 of the drawings. The body portion 49 is preferably provided with the inclined upper face 50 which in turn is provided with transversely extending ribs 51 similar to the ribs 42 of the hinge member 40.

It will be apparent that two hinges will be provided, one hinge connecting each track section 20 to the corresponding element 37. When the hinge members are fixed to the track sections 20 and members 37 and are then pivotally secured together by the hinge pins 45, the section 35 will be hingedly secured to the rear end of the track sections 20. It will be noted that the inclined surfaces on the hinge members extend in opposite directions on opposite sides of the hinge connection and thus provide short auxiliary runways to permit the running of vehicles longitudinally of the elongated runway formed by the elements 37 and elements 20. The transversely extending ribs 42 and 51 serve not only to reinforce the hinge members, but serve also to provide traction for the wheels of vehicles run longitudinally of the complete runway so that the vehicles may be readily driven over the hinged joint, as will be readily apparent.

For supporting the hinged section 35 in substantially horizontal vehicle supporting position, a transversely extending channel member 60 is secured as by welding or the like to the forward ends of the members 36. The member 60 extends slightly beyond the sides of the elements 36 and is positioned directly opposite to the member 30 which is fixed to the rear ends of the elements 11. Thus, when the hinge section 35 is in vehicle supporting position, the webs of the members 30 and 60 abut each other to limit downward movement of the hinge section.

Suitable plates 61 are preferably fixed to the projecting ends of the members 30 and 60, and these plates, together with the webs of the members 30 and 60, are bored as at 62 to receive bolts 63. These bolts, together with the nuts 64 associated therewith, provide means for securing the members 30 and 60 to each other to thus prevent upward movement of the hinge section after the latter has been moved to its horizontal vehicle supporting position.

From the above it is believed that the structure and operation of the invention will be clearly apparent. The semi-trailer comprises an elongated runway formed by the track sections 20 and 37. This runway is of sufficient length to receive at least four vehicles arranged end to end. In use, with the track sections 37 in horizontal position, the semi-trailer is loaded with vehicles, these vehicles being run on to the runway from the rear end thereof by suitable skids or the like (not shown), which are placed in inclined position from the rear ends of the track sections 37 to the ground. The inclined faces of the upper sides of the hinge members provide for the running of vehicles longitudinally of the runway and over the hinges to desired positions on the runway.

After the semi-trailer has been driven to the point of distribution of the vehicles, it is unloaded, and instead of driving back each individual trailer and its tractor or truck, one of these trailers and trucks is run on a second trailer. To prevent the rear end of the trailer being carried back from projecting beyond the end of the trailer on which it is loaded, the hinged rear end of the trailer being carried is folded forwardly to the position shown in dotted lines in Fig. 1 of the drawings. Thus, one trailer may be supported on the other without, however, the overall length of the two trailers exceeding the limits as to length set by the State statutes.

It will be obvious that the extension 35 of the trailer may be moved to operative and inoperative positions by any desired means, and no structure for accomplishing this purpose is therefore illustrated in the drawings or described in the specification. Under some circumstances this extension may be sufficiently light to be moved from operative to inoperative positions by hand, while in other cases it may be necessary to utilize suitable actuating mechanism which may be readily associated with the extension by any one skilled in the art.

In the embodiment of the invention shown in the drawings, the extension 35 is shown as being hingedly connected to the main runway. It is to be understood, however, that the invention is not limited to this particular manner of mounting the extension. The invention in its broader aspects contemplates the provision of a semi-trailer having a main runway and an auxiliary runway constituting, when in operative position, an extension of the main runway. Further, the invention contemplates so connecting the auxiliary runway to the main runway as to provide for movement of the auxiliary runway to a position where the overall length of the semi-trailer will be no greater than the length of the main runway. Thus, if desired, suitable detachable connections might be provided between the auxiliary runway and the main runway, these detachable connections being substituted for the hinges. In such a construction the auxiliary runway might be entirely disconnected from the main runway when the semi-trailer is not in use, and the auxiliary runway might be either positioned on top of the main runway or positioned on suitable supports below the main runway during transportation of the semi-trailer back to the point of loading.

While the invention has been described with considerable detail, it is to be clearly understood that the description is for the purposes of illustration only and is not definitive of the limits of the inventive idea. The right is therefore reserved to make all such changes in the details of construction and arrangement of parts as will fall within the purview of the attached claims.

What I claim as my invention is:

1. In a transportation means of the class described, a main subframe construction, a pair of main track sections supported by said subframe construction and providing an elongated runway, an auxiliary subframe construction, a pair of track sections carried by said auxiliary subframe construction and providing an auxiliary runway, means hingedly securing said auxiliary track sections to the ends of said main track sections, and means fixed to the rear end of said main subframe construction and to the forward end of said auxiliary frame construction providing abutments for limiting movement of said auxiliary track sections about their points of hinged connection to said main track sections.

2. In transportation means of the class described, means including a longitudinally extending structural member providing a track section for carrying vehicles to be transported, means including a longitudinally extending structural member in rear of the member aforesaid and providing a second track section for carrying vehicles to be transported, and a hinge connecting said track sections and having portions in line with and forming extensions of said track sections.

3. In a transportation means of the class described, a main runway for receiving vehicles to be transported, an auxiliary runway movable from a position in line with to a position substantially parallel to said main runway, and means connecting said auxiliary runway to said main runway and having portions in line with and forming extensions of said runways.

4. In a transportation means of the class described, a main runway for receiving vehicles to be transported, an auxiliary runway movable from a position in line with to a position substantially parallel to said main runway, and means connecting said auxiliary runway to said main runway and having inclined portions forming extensions of and providing a ramp for the wheels of vehicles over the joint between said runways.

5. In a transportation means of the class described, a rigid runway of sufficient length to receive a plurality of vehicles arranged end to end, an extension for said runway hingedly connected to the rear end thereof and movable vertically from a vehicle carrying position in line with the runway to an inoperative position parallel thereto, supporting sub-frames for said runways in abutting end to end relation, and means detachably connecting said sub-frames when the runways aforesaid are in line.

6. In a transportation means of the class described, a semi-trailer having an elongated frame, ground engaging wheels suspended directly from said frame intermediate the ends thereof, an elongated runway rigid with said frame and of sufficient length to receive a plurality of vehicles arranged end to end, an auxiliary elongated frame detachably connected to the main frame in abutting end to end relation, a runway rigid with said auxiliary frame and hingedly connected to the runway on the main frame, whereby the auxiliary frame and runway thereon may constitute a vehicle supporting extension of said main frame and runway or may lie between the ends of and substantially parallel to the runway on the main frame so that the overall length of said semi-trailer may be decreased when the semi-trailer is not in use for the transporting of vehicles.

7. In a transportation means of the class described, a semi-trailer having a fixed runway section designed to carry a plurality of automobiles, and provided at the rear end of said fixed section with a hinged runway section designed to carry an automobile and capable of swinging vertically from a position substantially in line with the fixed section to a position substantially parallel to said fixed section.

8. In a transportation means of the class described, a trailer having a main frame and a vehicle runway thereon, an auxiliary frame and runway thereon, a connection between said runways permitting said auxiliary frame and runway to swing upwardly and forwardly from a position where they constitute a vehicle supporting extension of said main frame and runway to a position where they are positioned intermediate the ends of said main runway, and a separable connection between said frames for holding the auxiliary frame and runway in said first mentioned position.

9. In a transportation means of the class described, a rigid elongated main sub-frame, ground engaging wheels suspended directly from said sub-frame intermediate the ends thereof, a track for automobiles supported in substantially parallel relation upon and rigid with said sub-frame, the rear end of said track being in substantially vertical alignment with the rear end of the sub-frame, an auxiliary elongated sub-frame abutting the rear end of the main sub-frame, a track for automobiles supported upon and rigid with said auxiliary sub-frame so as to be in alignment with the track on the main sub-frame, a connection between the adjacent ends of the sub-frames for detachably holding the same in alignment, and a connection between the adjacent ends of the tracks operable when the first mentioned connection is broken for permitting the sub-frame and track rigid therewith to be swung upwardly and forwardly over and in substantially parallel relation to the track upon the main sub-frame.

10. In a transportation means of the class described, a rigid elongated main sub-frame, ground engaging wheels suspended directly from said sub-frame intermediate the ends thereof, a track for automobiles extending longitudinally of and rigid with said sub-frame, an auxiliary elongated sub-frame in alignment with and constituting a rearward extension of the main sub-frame, a track for automobiles supported upon and rigid with said auxiliary sub-frame so as to be in alignment with the track on the main sub-frame, a separable connection between the adjacent ends of the sub-frames for detachably holding the auxiliary sub-frame in alignment with the main sub-frame, and a hinged connection between the adjacent ends of the tracks operable when the connection just mentioned is broken for permitting the sub-frame and track thereon to be swung upwardly and forwardly over and in substantially parallel relation to the track upon the main sub-frame.

11. In a transportation means of the class described, a main sub-frame construction, an elongated runway upon and rigid with the sub-frame construction, an auxiliary sub-frame construction, a runway upon and rigid with the auxiliary sub-frame construction, means hingedly securing said auxiliary runway to the main runway, means fixed to the rear end of the main sub-frame construction and to the forward end of the auxiliary sub-frame construction providing abutments for limiting movement of said auxiliary runway about its hinged connection, and means engaging the last mentioned means for detachably connecting said auxiliary sub-frame to said main sub-frame.

12. A trailer comprising a front and a rear section, movable relative to each other about a horizontal pivot from a folded to an extended position and in end to end abutting relationship in the extended position, and the two sections being so arranged that the rear section may be swung to a position above the front section so that the overall length of the two sections in the folded position is not materially greater than the length of the front section.

13. A trailer comprising a front and a rear section, and a horizontal pivot connecting adjacent ends of said front and rear sections whereby the rear section is movable from an extended position in alignment with the front section to a folded position approximately parallel to the front section, the overall length of the two sections being not materially greater than the length of the front section when the rear section is in the folded position aforesaid, and means in addition to the pivot aforesaid for securing the rear section to the front section when the rear section is in extended position.

14. A trailer comprising a front and a rear section, each section being provided with a pair of spaced longitudinally extending tracks for automobiles, a horizontal pivot connecting adjacent ends of said front and rear sections whereby the rear section is movable vertically from an extended position in alignment with the front section to a folded position approximately parallel to the front section, so that the over-all length of the truck and trailer is not materially greater than the over-all length of a similar truck and trailer on which it may be superimposed, the pair of tracks on one section being aligned with the pair of tracks on the other section when the rear section is in extended position and being substantially parallel with the pair of tracks on the other section when the rear section is in folded position.

JESSE B. MILLER.